Jan. 27, 1942.  N. T. KASZAB  2,271,196
SCREEN FOR STRIPE-COMPOSITE STEREOSCOPIC PICTURES
Filed July 19, 1939

Nicholas T. Kaszab
INVENTOR,
BY Julian Wittal,
his ATTORNEYS.

Patented Jan. 27, 1942

2,271,196

UNITED STATES PATENT OFFICE 2,271,196

SCREEN FOR STRIPE-COMPOSITE STEREOSCOPIC PICTURES

Nicholas T. Kaszab, New York, N. Y.

Application July 19, 1939, Serial No. 285,247

2 Claims. (Cl. 88—1)

This invention relates to cylindrically lenticulated transparent screens for making stripe-composite stereoscopic pictures and for viewing the same and is an improvement on my invention disclosed in U. S. Letters Patent No. 2,150,225 granted to me on March 14, 1939.

The main object of this invention is to provide a novel screen which will be more simple and less expensive than the complex screen described in said patent, this novel screen to be used for subjects which do not require such a great depth as produced by the screen of said patent.

Another object of this invention is to provide a screen adapted to produce and to display stereoscopic images of sharp and even definition all over the picture, as against pictures made by simple cylindrically lenticulated screens heretofore proposed and having less definition on the lateral margins than in the middle portion of the picture.

Still another object of this invention is to provide a simple screen, adapted to produce stereoscopic pictures of larger widths than was feasible heretofore with simple cylindrically lenticulated screens.

The processes to make the stripe-composite stereoscopic pictures are known and may be readily applied to the making of such pictures with my novel screen.

Some of the problems inherent to all pictures of this class which are solved by my novel screen herein proposed are, as follows:

It is known that the width of the opening of a simple lens (spherical, as well as, cylindrical) is in a reverse ratio to its angle of operation, on account of the aberration, coma, and the curved focal field. On the other hand, the said width of opening of the cylindrical lens elements of a screen is in a direct ratio to the lateral viewing angle of the stereoscopic picture. So, a compromise must be found as to the openings of the cylindrical lens elements in order that the picture may have the maximum viewing angle with the best possible definition. In this respect, the following must be taken into consideration: Stripe composite stereoscopic pictures are made by either using a series of camera-lenses, laterally spaced, or one camera lens, successively displaced laterally, in both cases the two extreme lens portions being in symmetrical relation to the center of the screen. With screens of uniform cylindrical lens elements, the most oblique focusing will occur when light rays from, say, the right extreme camera lens, are incident on the left margin of the screen, or vice versa. This worst condition will govern or limit, both, the projection or viewing angle, and also the practicable width of the picture. In any case, the lateral marginal parts of the image will have less definition than the center part.

To remedy this condition, I propose (briefly stated) to arrange the cylindrical lens elements in such a manner as to face a common center, it being the desired center position of the camera lens. With this arrangement, the cylindrical lenses on the margins of the screen will receive light-rays from the extreme positions of the camera lens no more obliquely than the cylindrical lenses at the center of the screen. As a result, the definition of the stripe-composite image will be uniform all over the picture, and a wider viewing angle and larger width of the picture may be attained.

In the drawing.

Referring now more particularly to the drawing where the same numerals denote identical parts, Fig. 1 and Fig. 2 will be referred to either simultaneously, or alternately, as noted.

Figure 1:
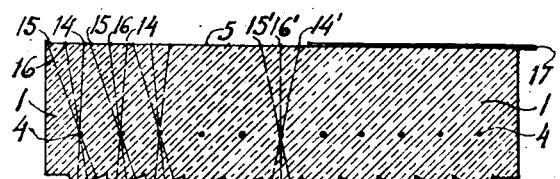
Fig. 1 is a diagrammatic cross sectional view of my screen with exaggerated proportions, for the sake of clearness, the number of the cylindrical refracting elements being greatly reduced, and the optical scheme of the light rays also being indicated.

The screen consists of a transparent plate 1, having a rear plane surface 5, and a front surface composed of convex cylindrical surface elements 2 and 2', (2' being the center one) and so-called plane breaks 3 and 3' between the respective cylindrical elements. The cylindrical elements have equal radii of curvatures R (Fig. 2) and equi-spaced axes of curvatures represented by the black dots 4, said axes 4 being located in a plane parallel to the plane surface 5 of the plate 1. Said cylindrical surface elements 2 are gradually tilted beginning at the center element 2' (Fig. 1) in such a manner, that the planes of symmetry indicated by the lines 4—13, for the respective cylindrical surface elements 2 or 2', converge and intersect in a line represented in Fig. 1 by the dot 13, this also representing the desired center position of the camera lens (not shown). The said planes of symmetry 4—13 are identical to the optical axial planes of the respective cylindrical lens elements. The cylindrical lens element 2', being at the center of the screen 1, is not tilted, and consequently, its plane of symmetry 4—13 is perpendicular to the plane surface 5 of the screen.

The imaginary geometrical planes of the said plane breaks 3, 3' also converge to and meet in said central line 13. The width of the plane breaks 3' at the center element 2' are near zero, while the widths, like 7—8, (Fig. 2) of the rest of the plane breaks 3, increase toward the lateral margins of the screen (Fig. 1).

The plane breaks are preferably made opaque on the screen used for making the pictures while on the viewing screens they may be left transparent, the resulting scattering of rays being negligible.

The thickness of the plate 1 is so chosen that light rays represented by the dash lines, like 20 to 24, (Fig. 2), will focus at the image receiving plane surface 5 within a very narrow stripe 30—31.

Referring to Fig. 1, the black dots 11, 12, 13, represent the left extreme, the center, and the right extreme positions, respectively, of the camera lens (not shown). Dash lines 12—15 and 11—14 represent light rays emanating from the said extreme positions, while 13—16 are light rays from the center position 13 of the camera lens proceeding along the optical axes 13—4 of the cylindrical lenses 2. The numerals 14—15 represent an image stripe element resulting of the light rays shown in Fig. 1, and other light rays from intermediate positions of the camera lens (not shown).

It will be seen that at the center element 2' (Fig. 1), of the screen, the extreme light rays 12—15' and 11—14' will form symmetrical angles 18' and 19' with the optical axis 13—16' of the cylindrical lens element 2'. The light rays 12—15 and 11—14 shown at the left margin of the screen will form angles 18 and 19 with the optical axis 13—16 of the respective cylindrical lens 2. The angles 18 and 19 are nearly symmetrical and slightly more acute than the said angles 18' and 19' at the center of the screen and consequently, the cylindrical lens elements at the margins of the screen are operating at slightly less oblique angles than the cylindrical lens elements at the center of the screen, and as a result thereof, the same degree of definition is attained at the margins and at the center of the stripe composite stereoscopic picture.

Figure 2:
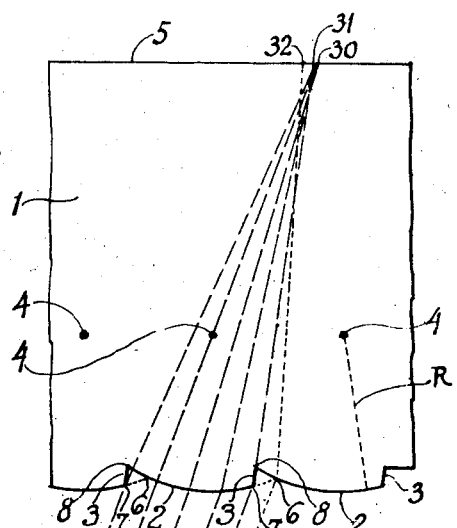
Fig. 2 is a diagrammatic end view of a fragmentary marginal detail of the screen of Fig. 1 greatly enlarged, a fragmentary detail of the center element being shown by dotted lines in an imaginary manner, the figure also showing the optical scheme of oblique focusing.

Fig. 2 illustrates the conditions just explained more in detail. The solid lines in this figure represent cylindrical lens elements near the right margin of the screen, while the dotted arcs 7—6 represent the right lateral end portions of lens elements at the center of the screen, which do not exist in the marginal elements at the right side of the screen when the axes of curvatures 4 are imagined as identically located for both lens elements. In other words, the arc 8—7 (Fig. 2) represents an actual marginal element, and the arc 6—6 represents the imaginary center element, the axes 4 being common to both.

The optical scheme in Fig. 2 illustrates the actual focusing of a marginal element, dash lines 20 to 24 indicating the light rays from the left lens position 11, incident on the marginal lens elements, said lens position 11 is illustrated in Fig. 1 and it is not shown in Fig. 2 on account of lack of space. The same dash lines 21 to 24 and the dotted line 25 represent imaginary light rays from the same point 11, but the center element of the screen shifted into the position of the respective right marginal element.

It will be seen that the light ray 21 going through the axis 4 is not refracted. The light rays 20 and 22 are symmetrically converging in relation to the axial ray 21, while ray 24 farthest from the axial ray 21 will intersect the rays 20—23 and will register in a line 31 on the image receiving surface 5 still within the reasonably narrow stripe 30—31.

In the case of the central element being substituted in the same position which is also the case with screens having uniform lens elements, as heretofore proposed, it will be seen that the cylindrical surface 6—6 will not receive light ray 20, thereby losing the best focusing light rays, while it will receive light ray 25, shown by dotted lines, which strongly intersect the light rays 21—24, resulting in a wide focal stripe 30—32, and consequently in a poor definition at the marginal part of the stripe composite image. Thus, Fig. 2 clearly illustrates the superiority of my screen with reference to screens having uniform lens elements as heretofore proposed.

The thin sheet 17, Fig. 1, represents a fraction of a layer of photographic material either bodily united with the screen, or just attached thereto, being supported on a sheet of film or paper as usual. Said thin sheet 17 may also denote a coat of aluminum paint or the like for screens used for images projected from the front.

The plane surface 5 (Fig. 2) of the screen may also be a translucent surface, like frosted glass (not shown), for stripe composite images to be projected from the rear of the screen.

What I claim as new, is:

1. The herein described screen for stereoscopic pictures, comprising a substantially straight transparent sheet having on one, the front, surface thereof a plurality of parallel convex focusing elements of equal focal lengths, each focusing element being slightly tilted in relation to the next element, so that all focusing elements will face in the direction of a common imaginary center, in front of the said surface, the convex surface of each focusing element being joined to the convex surface of the next focusing element by a plane surface, the rear plane surface for said sheet substantially being in the focal plane of said focusing elements.

2. A screen for stereoscopic pictures, comprising a substantially straight transparent sheet having on one, the front, surface thereof a plurality of parallel convex focusing elements, said elements being of equal widths, of equal radii of curvatures, and having equi-spaced axes of curvatures, the spacing of said axes being slightly larger than the width of the focusing elements, each focusing element being slightly tilted in relation to the next focusing element in such a manner that the principal optical axes of all focusing elements intersect in front of the said front surface of said sheet, the convex surface of each focusing element being joined to the convex surface of the next focusing element by a plane surface, the rear plane surface of said sheet substantially being in the focal plane of the focusing elements.

NICHOLAS T. KASZAB.